United States Patent [19]
Seibert et al.

[11] Patent Number: 5,239,652
[45] Date of Patent: Aug. 24, 1993

[54] ARRANGEMENT FOR REDUCING COMPUTER POWER CONSUMPTION BY TURNING OFF THE MICROPROCESSOR WHEN INACTIVE

[75] Inventors: Mark H. Seibert, Cupertino; Markus C. Wallgren, Palo Alto, both of Calif.

[73] Assignee: Apple Computer, Inc., Cupertino, Calif.

[21] Appl. No.: 650,053

[22] Filed: Feb. 4, 1991

[51] Int. Cl.$^5$ ............................ G06F 15/00; G06F 11/30
[52] U.S. Cl. ................................. 395/750; 364/707; 364/DIG. 1; 364/273.1; 364/241
[58] Field of Search ............... 395/750; 364/707, 141, 364/191, 701

[56] References Cited

U.S. PATENT DOCUMENTS

| | | | |
|---|---|---|---|
| 4,698,748 | 10/1987 | Juzswik et al. | 364/200 |
| 4,769,768 | 9/1988 | Bomba et al. | 395/725 |
| 4,809,163 | 2/1989 | Hirosawa et al. | 395/750 |
| 4,851,987 | 7/1989 | Day | 395/550 |
| 4,870,570 | 9/1989 | Satoh et al. | 395/750 |
| 4,965,738 | 10/1990 | Bauer et al. | 364/483 |
| 5,142,684 | 8/1992 | Perry et al. | 395/750 |

Primary Examiner—Robert B. Harrell
Assistant Examiner—Mehmet Geckil
Attorney, Agent, or Firm—Blakely, Sokoloff, Taylor & Zafman

[57] ABSTRACT

A power consumption reduction method and apparatus for a computer is described. The operating system running on the CPU of the computer determines when the CPU is not actively processing and generates a power-off signal to a control logic circuit. The control logic circuit then disconnects the CPU from the power supply. Pulses sent by a periodic timer or interrupts from input/output units are applied to the control logic circuit to at least periodically issue a power-on signal to the CPU. Power is supplied to the CPU for a given time period at every power-on signal. During this period, the CPU executes miscellaneous housekeeping chores including the polling of disk drives and determines when the CPU should resume normal processing. The control logic circuit also determines, at every power-on signal, whether the CPU is already on or being turned off. The control logic circuit will not issue a reset signal to enable the reset of the CPU if it is already on. If, however, the CPU has been turned off by the operating system, the control logic circuit will reset the CPU at every periodic power-on signal until CPU resumes its normal operation.

8 Claims, 9 Drawing Sheets

FIG_3

FIG_4

FIG_5

FIG_6

FIG-7

FIG_9

FIG_10

FIG_11

| A | B | C | 506 | | 510 | |
|---|---|---|---|---|---|---|
| | | | D | $\overline{Q}$ | D | Q |
| 0 | 0 | 0 | 1 | 0 | 1 | 1 |
| 0 | 0 | 1 | 1 | 0 | 0 | 0 |
| 0 | 1 | 0 | 0 | 1 | 0 | 0 |
| 0 | 1 | 1 | 0 | 1 | 0 | 0 |
| 1 | 0 | 0 | 0 | 1 | 0 | 0 |
| 1 | 0 | 1 | 0 | 1 | 0 | 0 |
| 1 | 1 | 0 | 0 | 1 | 0 | 0 |
| 1 | 1 | 1 | 1 | 0 | 0 | 0 |
| 0 | 0 | 0 | 1 | 0 | 1 | 1 |

ARRANGEMENT FOR REDUCING COMPUTER POWER CONSUMPTION BY TURNING OFF THE MICROPROCESSOR WHEN INACTIVE

FIELD OF THE INVENTION

The present invention relates to the field of computer power consumption, and more particularly to a scheme of reducing power consumption in a central processing unit of a computer.

BACKGROUND OF THE INVENTION

Power consumption in a computer system or a data processing device which includes a central processing unit (CPU), a memory and a group of peripheral units is always a significant concern. A power supply must be designed in the device to adequately power each unit. For example, the memory in the system is generally constituted by dynamic RAM (random access memory) and ROM (read only memory). When in use, power should be continually supplied to the RAM memory to sustain the information stored in the memory because of the volatile nature of the DRAM. The CPU should also be maintained fully powered during the operation of the system as it is the central unit in the system to control and manage every operation within the system including input/output operations by the peripheral units, information read and/or write operations in the memory and the data processing operations conducted by the CPU itself.

Aside from the capability of the power supply to provide ample power to power the units in the system, heat dissipation, physical size, weight, efficiency, and other related characteristics are paramount in designing or selecting the power source. These characteristics are exceptionally critical when the system the power supply is to support is a portable unit.

There are, in the prior art, many schemes for monitoring and controlling the consumption of power to a data processing device or devices when full operation is not desired or necessary. Many of them, nevertheless, are directed to power conservation of the memory unit of the device as it appears that the memory unit consumes considerable amounts of power. A number of known prior art references for monitoring and controlling the power consumption for a memory device are listed as follows:

1. U.S. Pat. No. 4,019,068, issued Apr. 19, 1977 for Low Power Output Disable Circuit For Random Access Memory;
2. U.S. Pat. No. 4,151,611, issued Apr. 24, 1979 for Power Supply Control System For Memory System;
3. U.S. Pat. No. 4,381,552, issued Apr. 26, 1983 for Standby Mode Controller Utilizing Microprocessor;
4. U.S. Pat. No. 4,712,196, issued Dec. 8, 1987 for Data Processing Apparatus.

It shall be noted that in some of these schemes more or less of the CPU's participation is required to remove the power supply from the memory unit when it is not accessed. It is, therefore, critical to keep the CPU powered so that the CPU can simultaneously respond to any request for the CPU's operation including monitoring any user input at any time.

However, for most of the time, the CPU idles, doing nothing but waiting for a memory operation or an input/output operation of the peripheral units. As it is impossible to utilize a simple on/off switch for CPU power consumption, other circuitry solutions to the problem have been proposed and one which can be described as having a "sleeping mode" for a CPU is referred to in the above mentioned U.S. Pat. No. 4,381,552 for Standby Mode Controller Utilizing Microprocessor. The apparatus disclosed in the reference generates a $\overline{\text{WAIT}}$ signal to the CPU when full operation is not required to put the CPU in a standby mode where power consumption is reduced. During this period, sampling occurs at intervals in order to activate the device fully when full operation is required. However, the disadvantage of such solution is that CPU still needs to be powered in the standby mode and any request for full power operation occurred between the sampling intervals has to wait until the next sampling pulse generated to bring the CPU to full power operation.

In order to bring the power consumption of a CPU down to a minimum, a sophisticated power consumption arrangement is necessary in a computer system or a data processing device for providing power to the CPU only when it requires such power and removing power from CPU when the device is not in full operation while still keeping the power supply to every other unit in the system so that the CPU power-off is transparent to users.

A number of prior art references have also been known for monitoring and controlling the power consumption to a device or to a portion of a device including a means for providing a turn-off function when user interaction from a peripheral device to the device has not occurred for a given time period. However, these references pertain to the simpler calculator technology and fail to disclose the unique power consumption arrangement for a central processing unit (CPU) in a computer system. The references are listed as follows:

1. U.S. Pat. No. 4,074,351, issued Feb. 14, 1978 for Variable Function Programmed Calculator;
2. U.S. Pat. No. 4,293,927, issued Oct. 6, 1981 for Power Consumption Control System For Electronic Digital Data Processing Devices;
3. U.S. Pat. No. 4,279,020, issued Jul. 14, 1981 for Power Supply Circuit For A Data Processor;
4. U.S. Pat. No. 4,409,665, issued Oct. 11, 1983 for Turn-Off-Processor Between Keystrokes;
5. U.S. Pat. No. 4,611,289, issued Sep. 9, 1986 for Computer Power Management System;
6. U.S. Pat. No. 4,615,005, issued Sep. 30, 1986 for Data Processing Apparatus With Clock Signal Control By Microinstruction For Reduced Power Consumption And Method Therefor.

SUMMARY AND OBJECTS OF THE INVENTION

In view of the limitations of known systems and methods, one objective of the present invention is to provide techniques that reduce the power consumption in a computer system.

In view of the limitations of known systems and methods, another objective of the present invention is to provide a method and apparatus for reducing power consumption by a CPU.

In view of the limitations of known systems and methods, another objective of the present invention is to provide a method and apparatus for controlling power to the CPU of a computer when it is not actively processing software in such a way that the user does not perceive a difference in the way the computer operates.

In view of the limitations of known systems and methods, another objective of the present invention is to provide a method and apparatus for powering-off the CPU of a computer while keeping other units in the computer fully powered when the CPU is determined not to be in an active state of processing and cycling power to the CPU to let it run periodically for executing user specified chores including the polling of peripheral inputs and outputs and also determining when the CPU should resume normal processing.

These and other objects of the invention are provided for by an apparatus for reducing the consumption of power of a CPU in a computer system. In the computer system, there are a central processing unit (CPU), an addressable memory having a predetermined storage capacity, a plurality of peripheral devices and a power supply for powering the computer system. According to the present invention, a program running on the CPU is provided for determining an inactive state of the CPU and generating a signal indicative of the inactive state of the CPU. A circuit having a timer is coupled to the plurality of peripheral devices for generating interrupts. The interrupts include periodic interrupts at predetermined intervals provided by the timer to the CPU for calling for required polling operations in which the CPU determines the state of at least certain peripheral inputs. A logic is coupled to receive the signal indicative of the inactive state of the CPU and the interrupts from the circuit and is coupled to the power supply. The logic controls the CPU being powered by the power supply such that the CPU is completely disconnected from the power supply and brought into full power substantially periodically at the predetermined intervals by the interrupts in the inactive state of the CPU. A reset circuit is connected to the CPU and to the logic to receive the signal from the program and the interrupts generated by the circuit for issuing a reset signal to reset the CPU. When the CPU is connected to the power supply by the logic after being disconnected with the power supply by the logic, the reset circuit generates the reset signal to the CPU, but the reset signal is not generated as a result of the periodic interrupt if the CPU is not in an inactive state.

These and other objects of the invention are provided for by a method for reducing the consumption of power of a central processing unit (CPU) in a computer system. The computer system in the present invention comprises a CPU, an addressable memory having a predetermined storage capacity, a plurality of peripheral devices and a power supply for powering the computer system. The method of the present invention comprises the step of:

generating a signal indicative of an inactive state of the CPU determined by executing a program on the CPU;

disconnecting the CPU from the power supply by a logic while maintaining the memory and the peripheral devices of the computer system fully powered by the power supply, the logic being responsive to the signal indicative of the inactive state of the CPU;

providing circuit for generating interrupts to the CPU for polling the state of at least one peripheral device, the interrupts including periodic interrupts generated at predetermined intervals by the circuit;

connecting the power supply to the CPU by the logic in response to the interrupts generated by the circuit for a predetermined time period during which the polling by a programming means is executed on the CPU; and resetting the CPU when the CPU is connected to the power supply by the logic after having been disconnected from the power supply by the logic in response to the signal indicative of the inactive state of the CPU.

These and other objects, features, and advantages of the present invention provided for will be apparent from the accompanying drawings and from the detailed description which follows below.

BRIEF DESCRIPTION OF THE DRAWINGS

The present invention is illustrated by way of example and not limitation in the figures of the accompanying drawings and in which like references indicate similar elements and in which:

FIG. 2 is a flow chart that shows the process of generating the power off signal when CPU is powered on;

FIG. 8 is a schematic circuit diagram illustrating an example of the hold circuit shown in FIG. 5;

DETAILED DESCRIPTION

Figure 1:
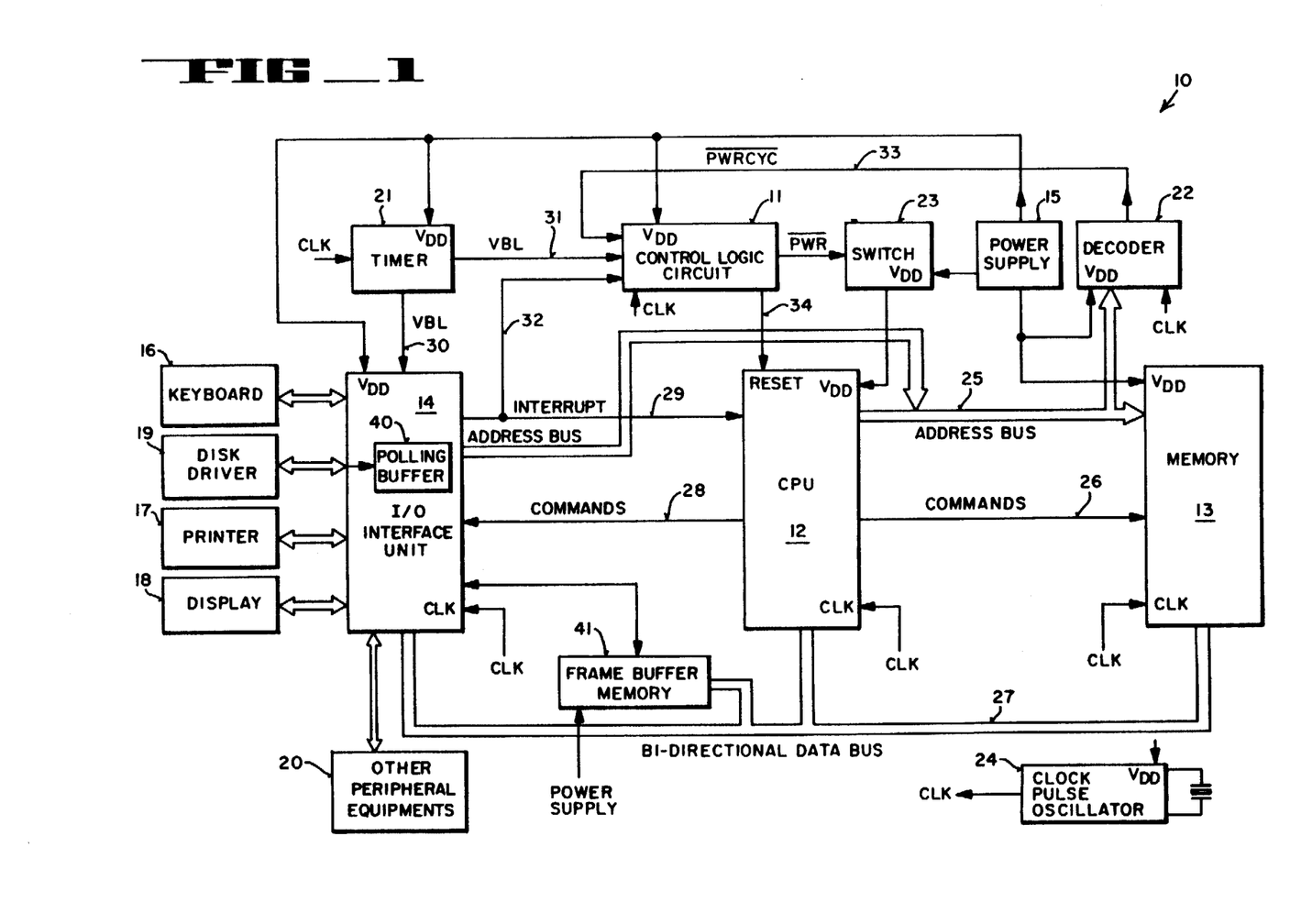
FIG. 1 is a circuit block diagram of the computer system including one embodiment of the power conservation apparatus.

Referring to FIG. 1, an architecture of a computer 10 according to the present invention is shown, including the control logic circuit 11. In FIG. 1, aside from the control logic circuit 11, computer 10 is comprised of a CPU 12, a memory 13, a power supply 15 and a conventional input/output interface unit 14 which is connected to a plurality of peripheral equipment that include a keyboard 16 as an input device and a printer 17 as an output device. These components are typically present in most computer systems. CPU 12 is typically a microprocessor. Memory 13 may comprise a RAM and a ROM. It is, however, apparent that memory 13 may include or be comprised of other type of memory devices.

Computer 10 further includes a display 18, a disk driver 19 and other peripheral equipment 20 which can be a serial communication controller and its drives, a parallel communication controller and its drivers, a sound circuit and its drivers, and a modem.

It is to be appreciated that the peripheral units 16–20 are conventional devices used in prior art computers and consequently a description of these units is not included herein. It shall be noted that although units 16–20 are included within computer 10, it is typically a design choice to include these devices in computer 10 and computer 10 can readily operate as a functioning computer without the presence of some of these units 16-20.

Several additional devices are included within computer 10 to operate with the control logic circuit 11. A timer 21, a decoder 22, a switch 23 and a clock pulse oscillator 24 are included in computer 10 to function in connection with control logic circuit 11.

In function terms, CPU 12 is the central processing unit for computer 10. In the preferred embodiment, CPU 12 is a 68000 based (part numbers 68000, 68020 and 68030) processor manufactured by Motorola Corporation. Memory 13, which typically includes RAM and ROM, is used to store the operating system of computer 10 as well as other programs, such as file directory routines and application programs, and data inputted from input and output interface unit 14. Memory 13 may include ROM which is used to store the operating system of computer 10. Memory 13 may include RAM which is utilized as the internal memory of computer 10 for accessing data and application programs. CPU 12 accesses memory 13 via an address bus 25. Commands in connection with the operation of memory 13 are sent from CPU 12 via line 26 to memory 13.

A bidirectional data bus 27 is intercoupled between CPU 12, memory 13 and input/output interface unit 14. The data are communicated via bidirectional data bus 27 between CPU 12, memory 13 and input/output interface unit 14 in response to the commands provided by CPU 12 under the operating system running on it. Power supply 15 is typically a DC power source which provides a constant DC power to various units of computer 10, particularly CPU 12. The clock pulse oscillator 24 provides a series of clock pulses for the necessary timing references that are needed for the operation of computer 10. The output CLK of clock pulse oscillator 24 is connected to each unit within computer 10 to synchronize the operation of computer 10.

Input/output interface unit 14 is a conventional, intelligent input/output interface controller which interfaces with various input/output devices 16-20. Keyboard 16 can also include cursor control devices, such as a mouse or a trackball. The disk driver 19 is used to access the disk storage medium, such as a floppy disk. In computer 10, a hard disk is coupled and accessed by the parallel communication controller included in the other peripheral equipment 20. The other peripheral equipment 20 may include a sound circuit and its driver which are utilized to generate various audio signals from computer 10 and may further include a modem. CPU 12 controls the operation of the conventional, intelligent input/output interface unit 14 with its peripheral devices 16-20 by sending the commands via line 28 to input/output interface unit 14. The data transfer between input/output interface unit 14 and its peripheral equipment 16-20 generate interrupts in input/output interface unit 14 and the interrupts are coupled to CPU 12 via line 29.

The operating system running on CPU 12 takes care of basic tasks such as starting the system, handling interrupts, moving data to and from memory 13 and peripheral devices 16-20 via input/output interface unit 14, and managing the memory space in memory 13. In the preferred embodiment, the operating system further provides the functions of monitoring programs running on CPU 12 and providing a power off signal to control logic circuit 11 via address bus 25 and a decoder 22 when it determines that CPU 12 is no longer actively processing a program and goes to an inactive state. These functions will be described in more detail below in connection with FIGS. 2-4.

Timer 21, controlled by clock pulse oscillator 24, generates a VBL interrupt signal to input/output interface unit 14 via line 30 once every approximately 1/60th of a second (frequency of 60 Hz). The periodic VBL interrupt signal is also applied from timer 21 directly to control logic circuit 11 via line 31. Combining the VBL interrupt signal with other interrupt signals from peripheral units 16-20, input/output interface unit 14 issues an interrupt signal INTERRUPT via line 29 to CPU 12. Input/output interface unit 14 also applies the INTERRUPT signal to control logic circuit 11 via line 32.

When CPU 12 receives an INTERRUPT signal, it is interrupted from its normal operation and responds to the interrupt in the conventional manner provided by the operating system. During the interrupt cycle, CPU 12 executes its regular interrupt routine which includes a periodic monitoring routine. The periodic monitoring routine performs the functions of updating the real time clock, checking the power supply and sending an auto poll command. The auto poll command is associated with the auto poll method of the preferred embodiment in which the CPU 12 automatically interrogates (polls) devices coupled to input/output interface unit 14 to determine the presence of data for transfer. CPU 12 controls the operation of the peripheral units 16-20 through input/output interface unit 14 by sending its commands via line 28 to input/output interface unit 14.

In order to provide the control over the consumption of power by computer 10 for the purpose of conserving the power consumption of CPU 12 when it is not actively executing programs, the operating system of computer 10 checks the status of CPU 12 at every interrupt cycle to determine whether CPU 12 is actively processing programs or remaining in an inactive state waiting for data to be transferred for processing. If CPU 12 is determined to be in an inactive state, the operating system will issue a reserved address via address bus 25 to decoder 22 at an interrupt. Decoder 22 then recognizes the reserved address and generates a power off $\overline{PWRCYC}$ signal to the control logic circuit 11 via line 33. Decoder 22 is a decoder/comparator which compares addresses over bus 25 with the reserved address, and when the reserved address is issued, decoder 22 generates the $\overline{PWRCYC}$ signal. Under the control of the $\overline{PWRCYC}$ signal, control logic circuit 11 generates a high $\overline{PWR}$ output to the switch 23 (which is typically a P-channel power MOSFET) which in turn switches off the VDD power to CPU 12 from the power supply 15. While CPU 12 is kept off by switch 23 under the control of the high $\overline{PWR}$ signal, other units in the computer system 10 are still fully powered by the power supply 15.

Controlled thereafter by the other VBL input from timer 21 via line 31 and INTERRUPT input from input/output interface unit 14 via line 32, control logic circuit 11 generates a periodically low $\overline{PWR}$ signal to switch such that the power from power supply 15 is resumed on CPU 12 for a predetermined time interval in order to poll the peripheral devices 16-20 and to perform other operating system tasks which may need periodic updating. As the VBL signal is generated by timer 21 at every approximately 1/60th of a second, control logic circuit 11 is ensured to issue a low $\overline{PWR}$ signal to switch 23 at least at every approximately 1/60th of a second regardless of whether an interrupt is generated at input/output interface unit 14 by the request for operation of the peripheral units 16-20. The frequency of the periodic VBL interrupt signal is not necessarily 1/60th of a second, but is a workable frequency providing a periodic interrupt. In other computer systems, any desired frequency signal could be required. Under the periodically low $\overline{PWR}$ signal, switch 23 periodically connects the power supply 15 to CPU 12 and an active low $\overline{RESET}$ signal is also connected to the reset pin of CPU 12 from the control logic circuit 11 via line 34. Control logic circuit 11 maintains the low $\overline{RESET}$ signal to the reset pin of CPU 12 until CPU 12 resumes normal full time operation. The low $\overline{RESET}$ signal from the control logic circuit 11 is provided to CPU 12 only when the CPU 12 has been disconnected from power supply 15 by a high $\overline{PWR}$ signal from the control logic circuit 11; in other words, if the CPU 12 is already powered on when a periodic interrupt occurs, the low $\overline{RESET}$ signal will not be issued from circuit 11.

For each power on interval controlled by the periodically low $\overline{PWR}$ signal to switch 23, CPU 12 is brought back to full power supply of VDD by switch 23. CPU 12 then interrogates devices that need to be polled (for example, disc driver 19) and does other housekeeping work which may be specified by the operating system as dictated by the user. During each power on interval, CPU 12 also runs the operating system to determine whether full power supply should be resumed on CPU 12. If the operating system determines that CPU 12 is requested to resume its normal operation, the power off $\overline{PWRCYC}$ signal is deasserted on control logic circuit 11. The periodically low $\overline{PWR}$ signal applied to switch 23 by control logic circuit 11 then becomes constantly low.

In short, the power conservation arrangement for CPU 12 of computer 10 is achieved by having the operating system running on CPU 12 check at a predetermined regular time interval the state of CPU 12. If the operating system determines CPU 12 is not actively processing, it issues the power off signal indicating the inactive state of CPU 12. The signal is sent out of CPU 12 through address bus 25 and is decoded by decoder 22 to become the power off $\overline{PWRCYC}$ signal. Decoder 22 then applies the power off $\overline{PWRCYC}$ signal to control logic circuit 11. Controlled by the power off $\overline{PWRCYC}$ signal, control logic circuit 11 outputs the high $\overline{PWR}$ signal to switch 23 to remove the VDD power supplied by the power supply 15 from CPU 12. The active low $\overline{RESET}$ signal is generated by control logic circuit 11 to reset CPU 12 on the next periodic power on interval. The $\overline{RESET}$ signal is asserted until the power off $\overline{PWRCYC}$ signal is eliminated from control logic circuit 11. Timer 21 runs even when CPU 12 is powered off. It provides the periodic VBL interrupt signal at a predetermined time interval which in this case happens to be approximately 1/60th of a second. The periodic VBL interrupt signal is applied to control logic circuit 11 to ensure the $\overline{PWR}$ signal is lowered periodically to switch 23. Under the periodically low $\overline{PWR}$ signal, full power supply VDD is brought back onto CPU 12 for a predetermined time interval. Running periodically, CPU 12 can interrogate (poll) the peripheral devices 16-20 that are needed for polling and do other system housekeeping work which the operating system may require as specified by the user. In this case, the user does not perceive a difference. The conventional input/output interface unit 14 includes, as part of its normal circuitry, a polling buffer 40 that stores status information about the peripheral devices 16-20, including particularly floppy disc driver 19. Polling buffer 40 is accessed during each polling operation so that CPU 12 will be able to check out whether the polled device has changed its status or not. If polling buffer 40 indicates that the polled device has changed its status, CPU 12 then is required to handle the status change. For example, when the user inserts a disc to disc driver 19, the status of disc driver 19 is changed and the change is detected during the polling operation. CPU 12 execution is then required to update the screen of display 18 to indicate such insertion.

Both memory 13 and input/output interface unit 14 are separately powered with CPU 12. During the power cycling period for CPU 12, memory 13 and input/output interface unit 14 are fully powered. input/output interface unit 14 is further coupled to a frame buffer memory 41 which is also separately powered with CPU 12. During the power cycling period for CPU 12, input/output interface unit 14 obtains information from frame buffer memory 41 and maintains the information displayed on the screen of display 18. In this way, the user does not perceive a difference in the computer's operation even though the CPU is off.

During each power on interval, the operating system is run to decide whether normal operation on CPU 12 is required and, if so, resume the normal power supply to CPU 12 by deasserting the power off $\overline{PWRCYC}$ signal applied to control logic circuit 11. Once CPU 12 is powered to operate full time, control logic circuit 11 deasserts the $\overline{RESET}$ signal to CPU 12 and will not respond to VBL or any other interrupt signal until next power off $\overline{PWRCYC}$ signal is received.

By this arrangement, CPU 12 is only powered on at a given frequency when it is not actively processing. During each power on interval, CPU 12 may execute any miscellaneous "housekeeping" work which the computer user may require and determines when normal power supply should resume on CPU 12. In this way, as much as 85% of power saving is obtained and this power saving is transparent to the user.

Figure 2:
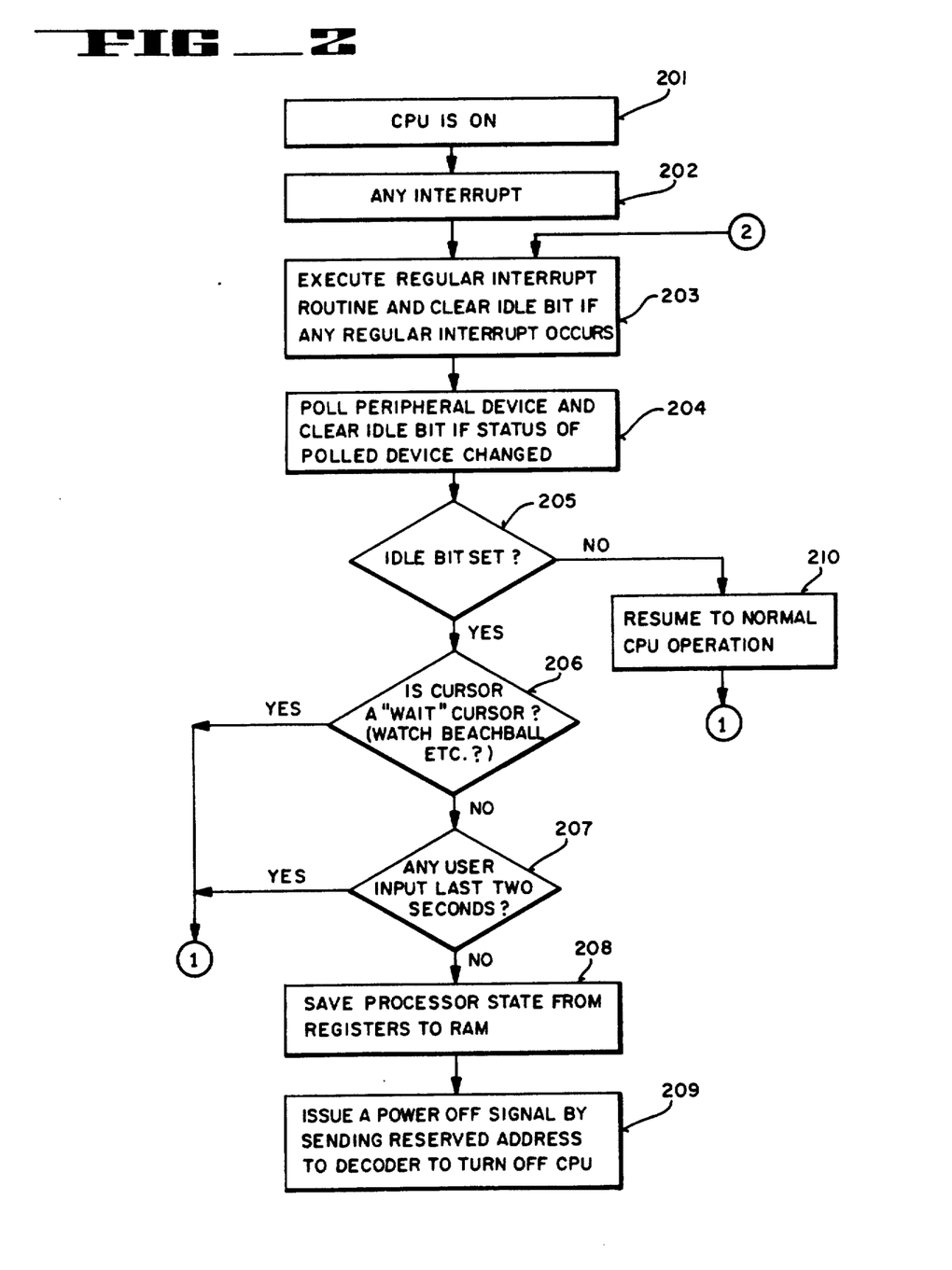
Figure 3:
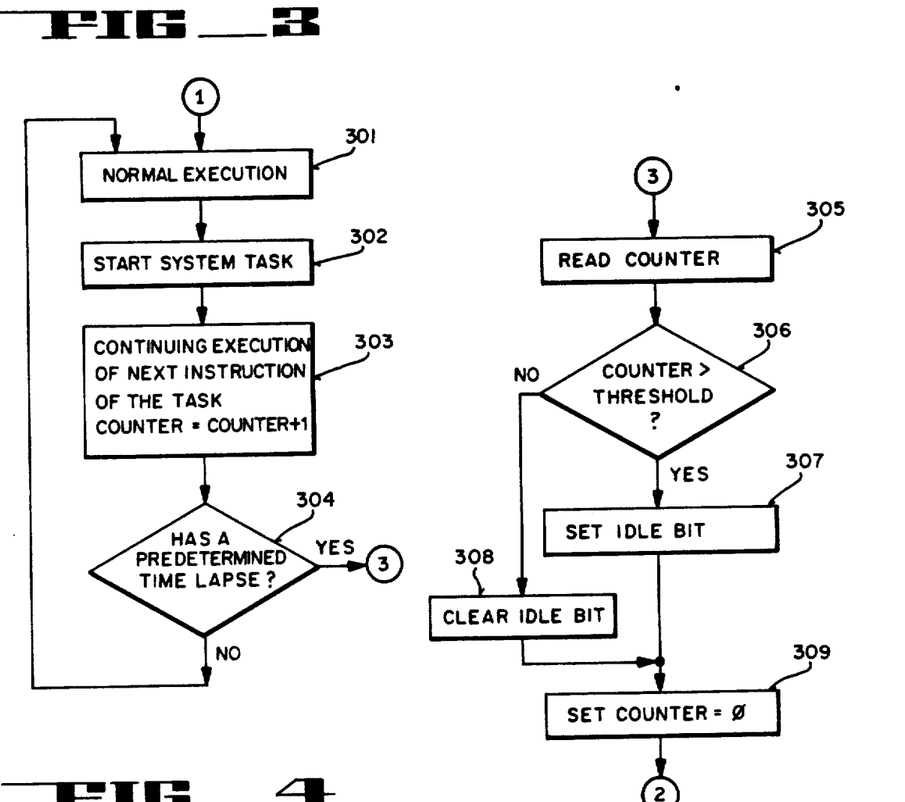
FIG. 3 is a flow chart that shows the process of determining the inactive state of CPU.
Figure 4:
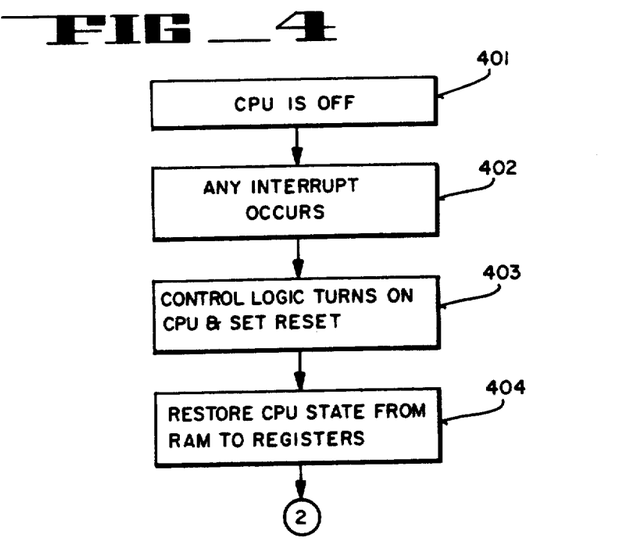
FIG. 4 is a flow chart that shows the process of generating the power off signal when CPU is being turned onto power.

The process of the software mechanism incorporated into the operating system for determining the operating state of CPU 12 and generating the power off $\overline{PWRCYC}$ signal to remove power supplied on CPU 12 is shown in the flowchart diagrams of FIGS. 2-4.

FIG. 2 is the flow chart illustrating the process of generating the power off signal to decoder 22 from which the power off signal $\overline{PWRCYC}$ is derived. In FIG. 2, the process is invoked each time CPU 12 is at the power on state for normal processing as at step 201. When an interrupt occurs to CPU 12 on line 29 as indicated at step 202, CPU 12 is set to stop its current processing and execute a conventional interrupt routine at step 203. At step 203, if the interrupt is determined to be a regular interrupt, the idle bit will be cleared. At step 204, peripheral devices are polled (especially the disc driver) and the idle bit is cleared if the polling finds that the status of a polled device is changed. This is done through polling buffer 40 in input/output interface unit 14 of FIG. 1. In step 205, the operating system determines whether CPU 12 is currently actively processing or is in an inactive state by checking whether the idle bit is set. If not, it means that CPU 12 is still actively processing and should resume the normal CPU processing operation at step 210. The process will then exit to node 1 for subroutine 1 (shown in FIG. 3). If it is found at step 205 that the idle bit has been established, the operating system then checks at steps 206 and 207 whether user input and/or output has happened in the last two seconds or whether the cursor is one of the wait cursors (e.g. a watch or hourglass). This is accomplished by having a storage location in memory 13 which stores the current status of the cursor. The storage location is checked and the data is read out by CPU 12. For example, if the value stored in the storage location is one of the values indicating it is a watch cursor, then the cursor is determined to be a watch cursor.

If either of these two conditions is satisfied, CPU 12 resumes its normal CPU operation to handle the user input and/or output and the process exits to node 1 for subroutine 1. If not, it means CPU 12 is in an inactive state and there is no user input and/or output. The operating system then stores the status of CPU 12 from the registers of the CPU 12 to RAM at step 208 in order to preserve the state of the CPU while it is off. This is done by reading the contents in the known registers in CPU 12 and then writing those contents into known locations in RAM by known program. At step 209, the operating system issues the power off signal from address bus 25 to terminate power supply to CPU 12.

The flow chart of FIG. 3 shows the subroutine 1. It illustrates the process of determining when CPU 12 is not actively processing and, therefore, setting the idle bit. In FIG. 3, following node 1, step 301 indicates that the operating system is in the state of normal execution of programs, which also typically includes handling of non-VBL interrupts (e.g. the user is typing on the keyboard). At step 302, the operating system starts a task which is specified as that a program is running on CPU12. At step 303, the operating system continues its execution of the program and the software of the present invention increments a counter by the operation of "COUNTER=COUNTER+1". The status of this counter will determine (via subroutine 3) whether the idle bit will be set. Step 304 is accomplished by instantly responding to the periodic VBL interrupt signal. Here, the predetermined time in step 304 coincides with the frequency of the periodic VBL interrupt signal which happens at every 1/60th of a second. It will be noted that the counter used for the idle bit is not related to the periodic interrupt. At step 304, if the predetermined time has not lapsed (i.e. the VBL interrupt has not occured), the operating system goes back to step 301 for normal execution. If the periodic VBL interrupt signal occurs, the operating system goes to node 3 to check the status of CPU 12. Following node 3 are the steps 305-309. Steps 305-309 together show the process of determining the status of CPU 12 and the setting of idle bit for CPU 12. The content of the counter is read out at step 305 and compared with a threshold at step 306 to determine whether CPU 12 is actively processing or staying in an inactively state. The threshold is an integer value which is set so that the CPU is turned off after a reasonably short period of time. In a typical embodiment, the value of the threshold will be the number of counts which is equivalent (given the system clock rate at which the counter is incremented) to 0.5 seconds. If the content of the counter is not greater than the threshold which means CPU 12 is in its active state for processing, the operating system goes to step 308 to clear the idle bit whether it has been set or not. If the content of the counter is determined to be greater than the threshold in step 306, the operating system then goes to step 307 to set the idle bit for CPU 12. This indicates CPU 12 is not actively processing. At step 309, the counter is cleared to zero in order to start with a new cycle. The operating system then goes back to node 2 in FIG. 2 for further execution.

FIG. 4 is a flow chart illustrating the process of providing power to CPU 12 when CPU 12 has been powered off. In FIG. 4, unlike the process shown in FIG. 2, the process is invoked each time CPU 12 is being powered on. Step 401 indicates that CPU 12 has been powered off by control logic circuit 11 under the power off signal issued by the operating system at step 209 in FIG. 2. CPU 12 remains in its off state until an interrupt occurs at step 402. The interrupt, which may be either the periodic interrupt or may be an interrupt generated by a user input, causes control logic circuit 11 to turn on the power supply to CPU 12 and set low the $\overline{\text{RESET}}$ signal to the reset pin of CPU 12 at step 403 ($\overline{\text{RESET}}$ is active low). As CPU 12 is turned on by control logic circuit 11 at step 403, the operating system starts its operation at step 404 to restore CPU state from RAM to the registers of the CPU and goes to node 2 of FIG. 2 for executing the conventional interrupt routine at step 203. The step of restoring the registers is performed in a routine manner by using known reading device (or commands) to read the information from the known locations in the RAM of memory 13 to the known registers in CPU 12. It then checks the idle bit at step 205 to determine the status of CPU 12. As described above in FIG. 2, if CPU 12 is requested to resume normal operation, the operating system will then go to step 210 to resume the normal operation. If CPU 12 remains inactive and no user input and output has been requested or conducted and the polling does not show any status change to the polled devices, the operating system will again issue the power off signal to turn off CPU 12 again at step 209. The ON-OFF process is repeated until the operating system determines that CPU 12 should resume its normal operation. CPU 12 is then powered on for its normal operation until the operating system once more determines that CPU 12 is in an inactive state and generates the power off signal to turn off CPU 12.

Figure 5:
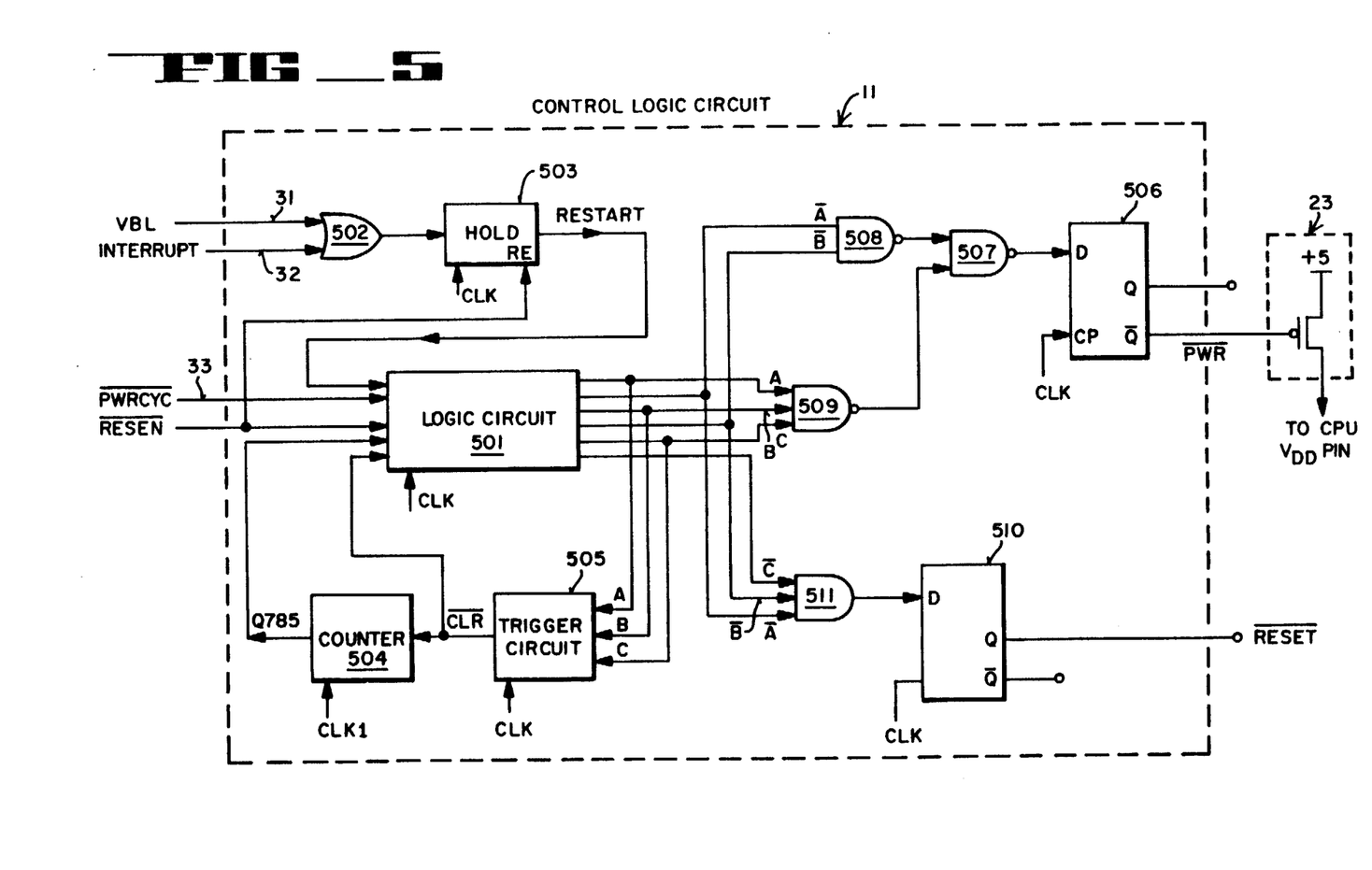
FIG. 5 illustrates in a more detail a block diagram of the control logic circuit employed in the computer system of FIG. 1.

FIG. 5 illustrates in more detail the block diagram of control logic circuit 11. In FIG. 5, periodic interrupt signal VBL from timer 21 and the interrupt signal INTERRUPT from input/output interface unit 14 are both applied to an OR gate 502 via lines 31 and 32 respectively and, therefore, to hold circuit 503. A RESTART signal is obtained from hold circuit 503 and is applied to a logic circuit 501 to provide the periodic interrupt input (as well as user caused interrupts) to logic circuit 501. The power of $\overline{\text{PWRCYC}}$ signal from decoder 22 is also provided to logic circuit 501 as an input of logic circuit 501. $\overline{\text{RESEN}}$ signal is connected to the reset input of both hold circuit 503 and logic circuit 501. $\overline{\text{RESEN}}$ signal is a hardware reset signal generated by a user operating a hardware reset switch (e.g. an off/on power switch or a programmer's reset button). Other input signals to the logic circuit 501 are a Q785 signal from a counter 504 and a $\overline{\text{CLR}}$ signal from a trigger circuit 505. The $\overline{\text{CLR}}$ signal is also inputted to counter 504 to control the start of counting 504. The $\overline{\text{CLR}}$ signal controls counter 504 to start its counting. When counter 504 counts 785, which is 50 microseconds in the preferred embodiment, it outputs the Q785 signal. This counter causes the logic circuit to hold down the reset signal for a sufficient period of time to reset the CPU 12. Logic circuit 501 has three outputs A, B and C and their inverted signals: $\overline{\text{A}}$, $\overline{\text{B}}$ and $\overline{\text{C}}$. Trigger circuit 505 is controlled by the output A, B and C of logic circuit 501. Through NAND gates 509, 508 and 507, the outputs A, B and C and the inverted signals, $\overline{A}$ and $\overline{B}$ are applied to the input of a D flip-flop 506 which outputs the power control signal $\overline{PWR}$ at its Q output. The $\overline{PWR}$ power control signal is then coupled to switch 23. Switch 23 is a P-channel power MOSFET, which has its gate connected to the $\overline{PWR}$ signal, its source to the power supply and its drain to CPU's VDD pin. The $\overline{RESET}$ signal is generated by a D flip-flop 510. An AND gate 511 combines the $\overline{A}$, $\overline{B}$ and $\overline{C}$ output signals from logic circuit 501 to the input of D flip-flop 510. The function of control logic circuit 11 shown in FIG. 5 with regard to the input signals can be better understood in conjunction with the state transition diagram shown in FIG. 6 and the logic table shown in FIG. 11.

Figure 6:
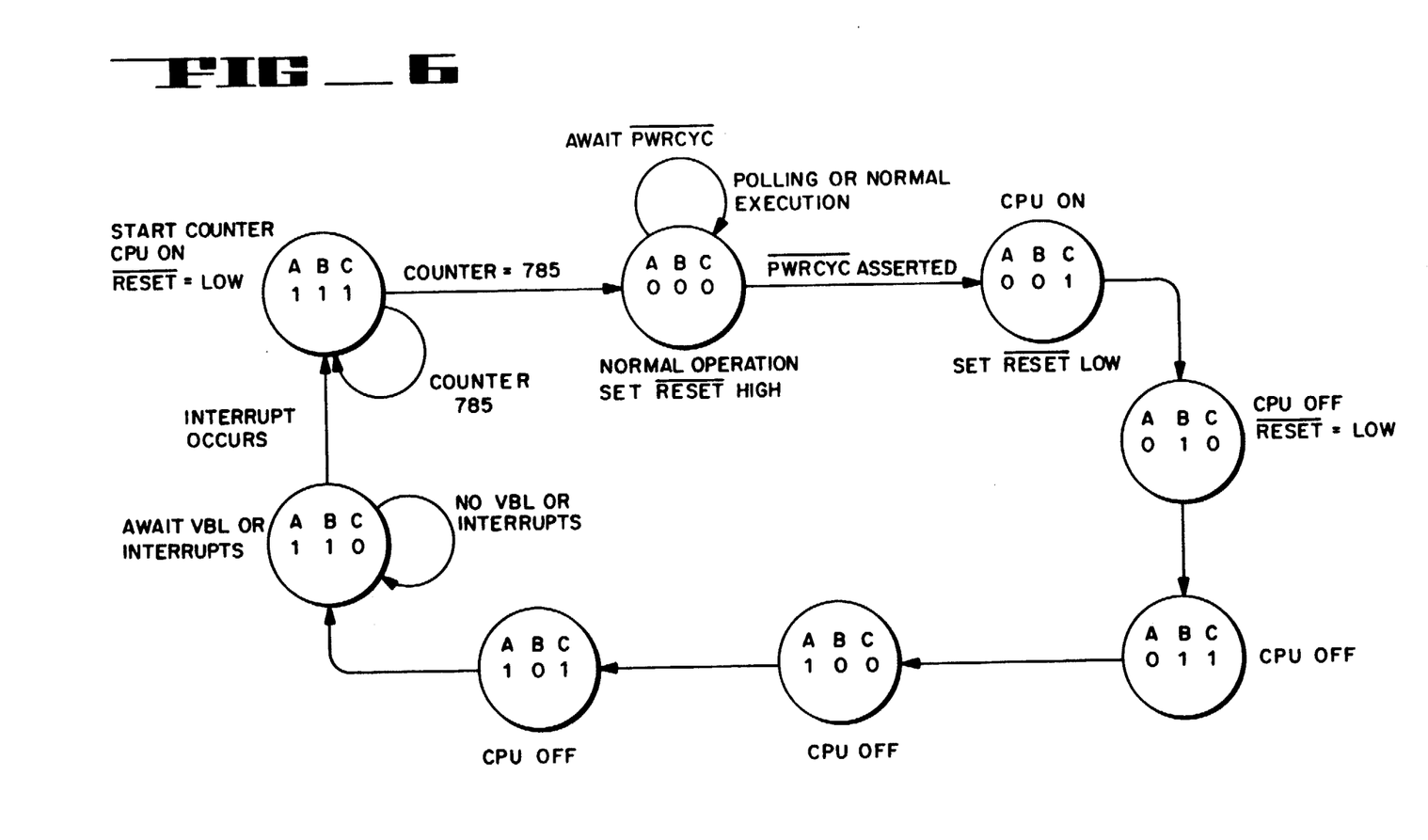
FIG. 6 is a state transition diagram for the control logic circuit of in FIG. 5.
Figure 11:
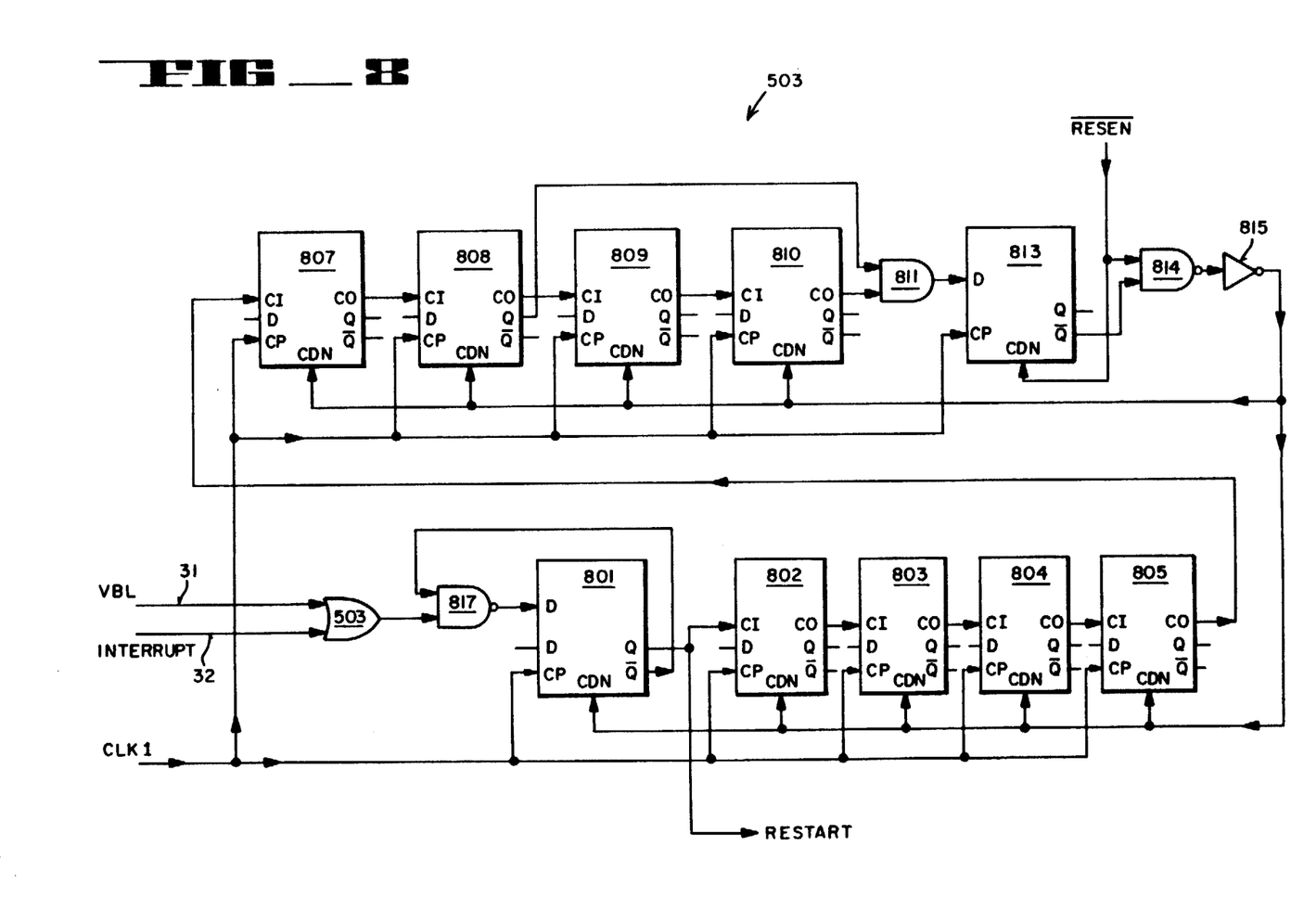
FIG. 11 is a logic table showing the relation of the outputs of the logic circuit and the $\overline{PWR}$ and $\overline{RESET}$ signal illustrated in FIG. 5.

Referring to FIGS. 6 and 11, eight output states of the outputs A, B and C of logic circuit 501 are illustrated ranging from "000" to "111". State "000" (A=0; B=0; C=0) indicates that CPU 12 is in its normal operation and no power off $\overline{PWRCYC}$ signal is applied to logic circuit 501. The periodic VBL interrupt signal or the INTERRUPT signal have no influence on logic circuit 501 to change its output states. In this state, the $\overline{RESET}$ signal remains logically inactive (i.e. in the logical high-1-state), and the $\overline{PWR}$ signal remains logically low (i.e. power on). Trigger circuit 505 keeps counter 504 cleared under this state. When the power off $\overline{PWRCYC}$ signal is received by logic circuit 501, the output A, B and C of logic circuit 501 then moves to the state of "001" (A=C=0; B=1). In this state, CPU 12 remains powered on. Control logic circuit 11 starts to power off CPU 12 by asserting the $\overline{RESET}$ signal to active low. At next clock pulse, logic circuit 501 moves its outputs A, B and C from state "001" to state "010". In this state, D flip-flop 507 generates a logically high $\overline{PWR}$ signal to disconnect power supply 15 from CPU 12. The states "011", "100" and "101" are the pass through states in which CPU 12 remains disconnected from the power supply and the $\overline{RESET}$ signal is maintained to be actively low. Clock pulses move logic circuit 501 through the pass through states until it reaches the state of "110" where logic circuit 501 remains cycling in this state until it receives the periodic VBL interrupt signal or the INTERRUPT signal (caused for example by a user input). When an interrupt signal occurs on either line 31 or line 32, the signal goes through the OR gate 502 and hold circuit 503 to become the RESTART signal. The RESTART signal then is applied to logic circuit 501 and the output of logic circuit 501 moves to the state of "111". In this state, power supply is brought back to CPU 12. Trigger circuit 505 outputs the $\overline{CLR}$ signal to counter 504, causing the counter to start counting. This state remains unchanged until counting of counter 504 reaches the number of 785 that represents 50 microseconds. During this period, the $\overline{RESET}$ signal is maintained actively low. While counter 504 counts for 50 microseconds, the power off $\overline{PWRCYC}$ signal is cleared (so power is supplied to CPU 12) and the outputs of logic circuit 501 are reset by the Q785 signal to the "000" state which awaits the power off $\overline{PWRCYC}$ signal. Again, in this state, CPU is on and normal operation is resumed. The $\overline{RESET}$ signal is set to inactive high and counter 504 is cleared first by the Q785 signal and then by the $\overline{CLR}$ signal from trigger circuit 505. If the power off $\overline{PWRCYC}$ signal is received at this time (because the CPU has gone through steps 403, 303 in FIG. 4 and then steps 205, 206, 207, 208 and then 209 in FIG. 2), logic circuit 501 again moves its outputs A, B and C to "001" state and so on through the cycle discussed above. CPU 12 will be again disconnected with power supply 15 until the next interrupt occurs. If the power off $\overline{PWRCYC}$ signal is not received in this state, CPU 12 will resume its normal operation (moving through step 210 in FIG. 2) until it receives a power off $\overline{PWRCYC}$ signal.

Figure 7:
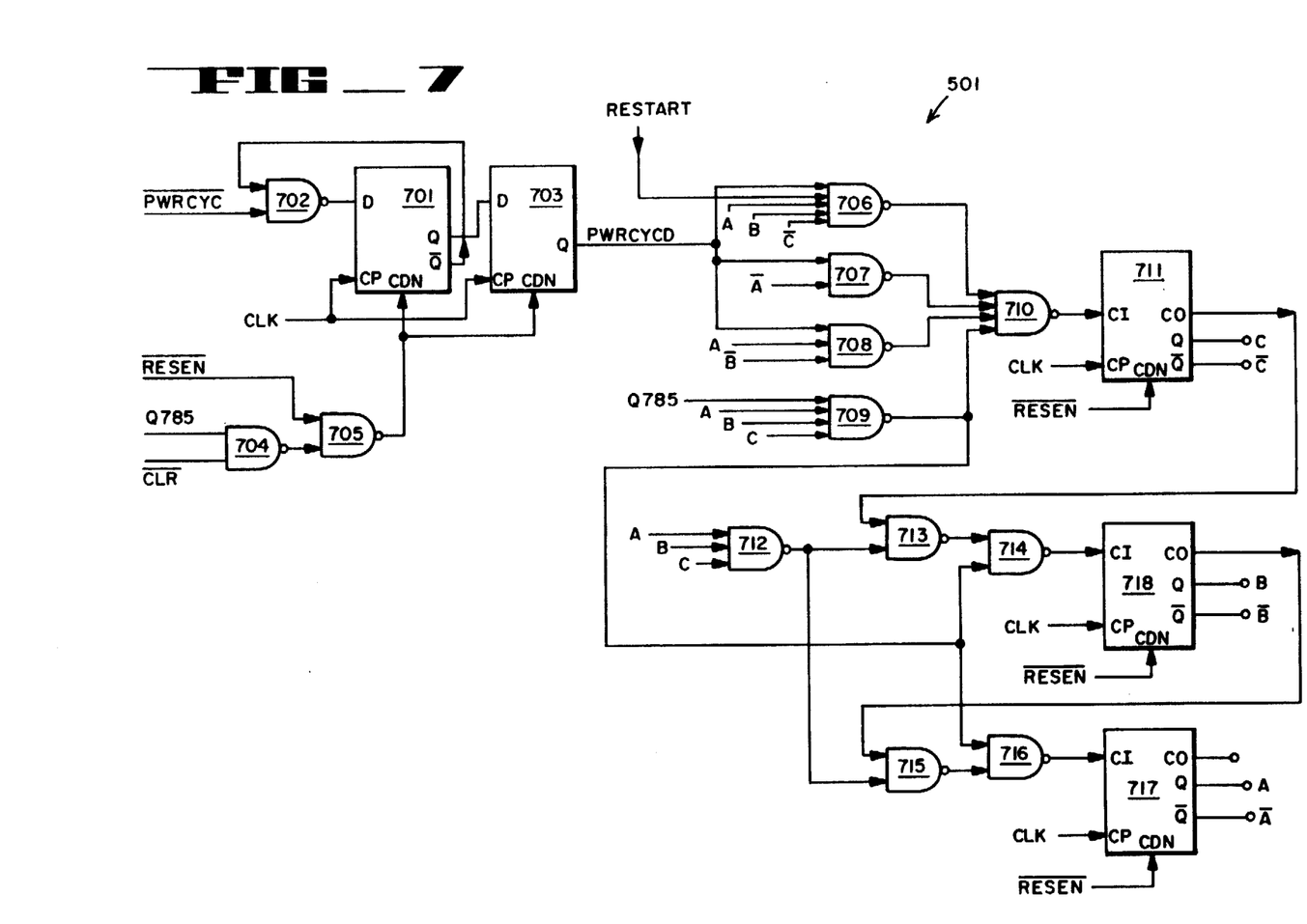
FIG. 7 is a schematic circuit diagram illustrating an example of the logic circuit shown in FIG. 5.

FIG. 7 illustrates the circuitry of logic circuit 501 of FIG. 5. In FIG. 7, D flip-flop 701 is connected to D flip-flop 703 to form a dual rank synchronizer which serves the purpose of eliminating any possible interference in the input signal $\overline{PWRCYC}$. The inverted output $\overline{Q}$ of D flip-flop 701 is fed back to its input side with the $\overline{PWRCYC}$ signal by a NAND gate 702. The feedback ensures to maintain a steady $\overline{PWRCYC}$ input on the input side of D flip-flop 701 even when the $\overline{PWRCYC}$ signal disappears. With the feedback function on the D flip-flop 701, D flip-flop 703 is able to constantly output a PWRCYCD signal which is the delayed and inverted signal of $\overline{PWRCYC}$. The PWRCYCD signal can only be cleared by applying a reset signal to the reset input CDN of both D flop-flops 701 and 703. The reset signal can be the $\overline{RESEN}$ signal generated by the operation of hardware reset switch. The reset signal can also come from a signal derived from the Q785 signal of counter 504 and $\overline{CLR}$ signal of trigger circuit 505. Element 711, 718 and 717 are three D flip-flops with carry input and carry output. Along with their associated NAND gates, these three D flip-flops 711, 718 and 717 are connected in a counter-like structure. Three different input signals PWRCYCD, RESTART and Q785 are applied to the NAND gates associated with the D flip-flops 711, 718 and 717. Each of the signals performs a different function to these three D flip-flops 711, 718 and 717. The Q785 signal is served to make these three D flip-flops 711, 718 and 717 to enter into the "000" state from its previous "111" state as shown in FIG. 6. When the PWRCYCD signal, the equivalent signal of $\overline{PWRCYC}$ signal, is applied to the three D flip-flops 711, 718 and 717, it moves the outputs A, B and C from the "000" state to the "001" state where the $\overline{RESET}$ signal is set actively low, then to the "010" state where CPU 12 is turned off and to the pass through states "011", "100", "101" and "110". When an interrupt occurs, the RESTART signal is generated. It serves to move from the "110" state to the "111" state where CPU 12 is brought back to power for 50 microseconds before the "111" state is moved to the "000" state by the Q785 signal. In this state, the $\overline{RESET}$ signal is kept at logic low level to ensure that the CPU 12 is properly reset while power is supplied to the CPU. The RESTART signal can only function at the state of "110". If the state of the three D flip-flops 711, 718 and 717 is in a state other than the "110" state, the RESTART signal is blocked by the output signals A, B, and $\overline{C}$ to perform any input function to the D flop-flops 711, 718 and 717. When counter 504 counts for 50 microseconds, the Q785 signal moves the "111" state to the "000" state where CPU 12 is fully powered and the $\overline{RESET}$ signal is set high.

FIG. 8 illustrates the circuitry of hold circuit 503 along with OR gate 502 shown in FIG. 5. Referring to FIG. 8, OR gate 502 combines the VBL and INTERRUPT signals to the input of D flip-flop 801 through NAND gate 817. The output signal RESTART is connected to the Q output of D flip-flop 801. This output is also connected to a delay circuit formed by a series of D flip-flops and their associate devices 802-815. Device 811 is an AND gate and device 814 is a NAND gate. The $\bar{Q}$ output of D flip-flop 801 is fed back to the input of NAND gate 817 to maintain the input signal. Output of inverter 815 is the output of the delay circuit. The output is connected to the reset input CDN of every D flip-flop in the hold circuit 503.

When either a VBL interrupt signal occurs on line 31 or an INTERRUPT signal occurs on line 32, OR gate 502 couples the interrupt signal to NAND gate 817. Since all D flip-flops in the hold circuit 503 have been reset by the previous output signal from inverter 815, the Q output of D flip-flop 801 is at "0" state. NAND gate 817 couples the interrupt signal to D input of D flip-flop 801. This interrupt signal is then stored in D flip-flop 801 and outputted to be the RESTART signal. The carry input of D flip-flop 802 also receives the interrupt signal from the Q output of D flip-flop 801 and carries it on to inverter 815 within a certain period of time. The signal is then outputted from inverter 815 to clear the RESTART signal and reset every D flip-flop in the hold circuit 503. In this way, the RESTART signal is maintained for a predetermined period of time.

Figure 9:
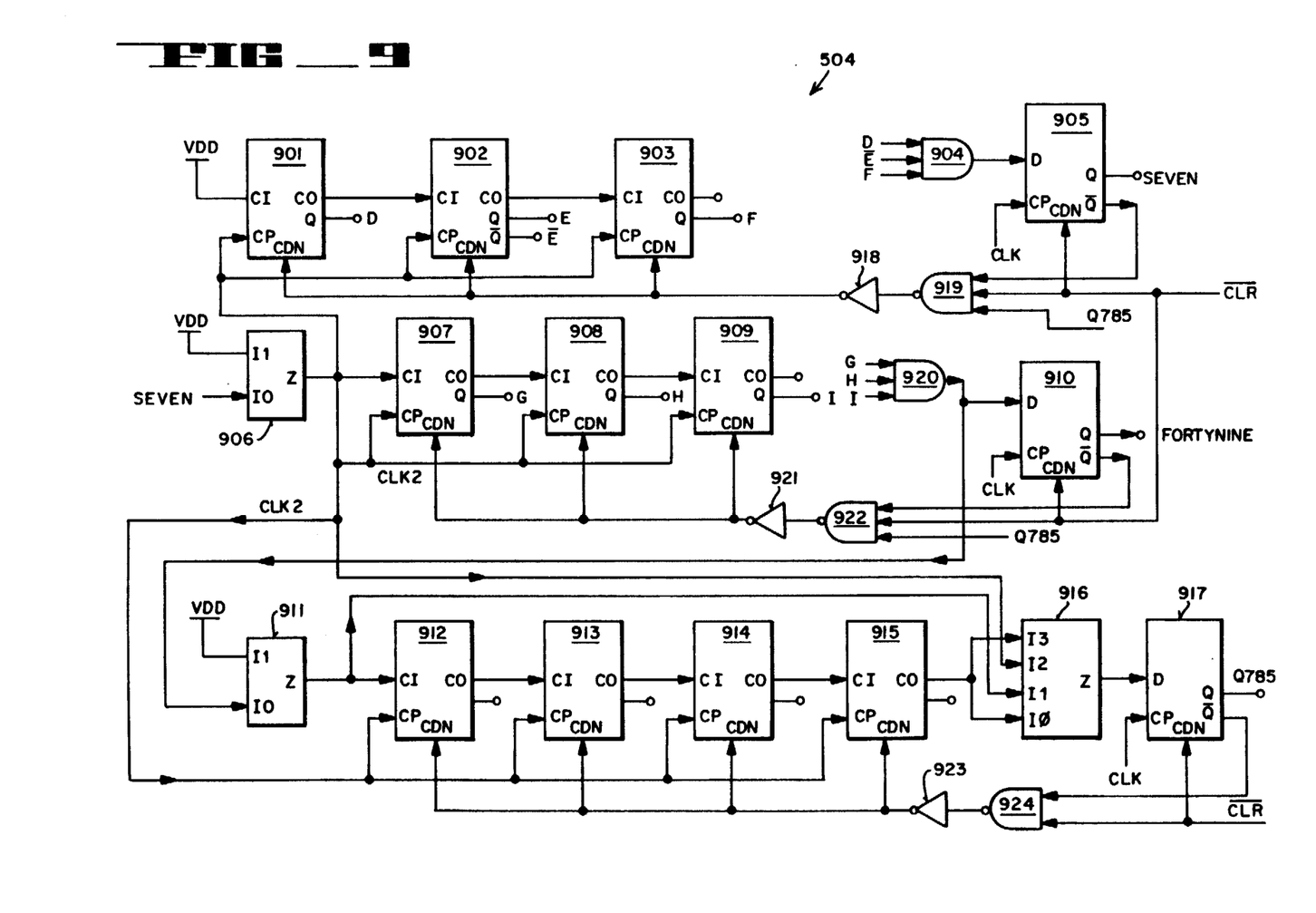
FIG. 9 is a schematic circuit diagram illustrating an example of the counter of FIG. 5.

FIG. 9 illustrates the circuitry of counter 504 shown in FIG. 5. In FIG. 9, the input signal $\overline{CLR}$ is coupled to the reset input CDN of every flip-flop in counter 504. When the $\overline{CLR}$ signal is raised to logical high, it allows counter 504 to start its counting. As the carry input of D flip-flop 901 is connected to a constant voltage VDD, counter 504 is incremented at every clock pulse. The counter is a 785 counter and when it counts 785, an output is received on the output of D flip-flop 917 as the Q785 signal. At this moment, counter 504 stops its counting by having the Q785 output signal coupled to a reset input CDN of every D flip-flop in the counter. The $\overline{CLR}$ signal then changes to active low that keeps counter 504 cleared until a $\overline{CLR}$ signal is raised to logical high. Alternatively, the counting is achieved through many conventional ways and counter 504 can be implemented by any conventional counting device.

Figure 10:
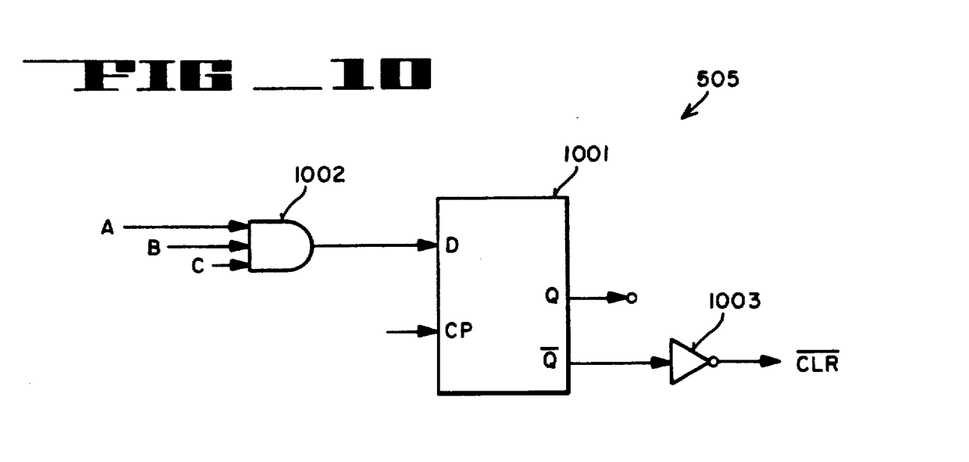
FIG. 10 is a schematic circuit diagram illustrating an example of the trigger circuit shown in FIG. 5.

FIG. 10 illustrates the circuitry of trigger circuit 505 shown in FIG. 5. In FIG. 10, an AND gate 1002 is connected to a D flip-flop 1001. An inverter 1003 is connected to the $\bar{Q}$ output of D flip-flop 1001. The $\overline{CLR}$ signal is outputted from inverter 1003. The input signals A, B and C are coming from logic circuit 501 in FIG. 5. The output signal $\overline{CLR}$ is coupled to counter 504 to control the start of the counting of counter 504. When all the inputs A, B and C are logically high the output $\overline{CLR}$ signal is logically high. This logically high signal triggers counter 504 to start its counting. As the input signals A, B and C are all connected to AND gate 1002, the output signal $\overline{CLR}$ receives a logical high signal only when the input signals A, B and C are all in logical high condition. At any other input conditions, the output signal $\overline{CLR}$ remains logically active low. The active low $\overline{CLR}$ signal keeps counter 504 cleared and when it is logically high it allows counter 504 to start counting.

In the foregoing specification the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. In a computer system having a central processing unit (CPU), an addressable memory for storing data and programs for operation on the CPU, a plurality of peripheral devices, and a power supply for supplying power to (1) the CPU, (2) the addressable memory, and (3) the plurality of peripheral devices, an apparatus for reducing power consumption of the CPU of the computer system comprising:

(A) programming means running on the CPU for determining an inactive state of the CPU and for generating a signal indicative of the inactive state of the CPU when the CPU is determined to be in the inactive state, wherein the programming means determines that the CPU is in the inactive state when the CPU does not have any data transfer with any one of the plurality of peripheral devices and the addressable memory and does not execute any program, wherein the programming means is stored in the addressable memory, wherein the CPU addresses the addressable memory to receive and execute the programming means;

(B) switching means coupled to the power supply and the CPU for selectively coupling the power supply to the CPU;

(C) timer means for periodically generating a periodic interrupt signal at a predetermined interval, wherein the timer means is coupled to the CPU for supplying the periodic interrupt signal to the CPU;

(D) polling means coupled to the plurality of peripheral devices and the CPU for polling status of at least one of the plurality of peripheral devices, and for generating a peripheral interrupt signal when the one of the plurality of peripheral devices polled requests an access to the CPU, wherein the polling means applies the peripheral interrupt signal to the CPU, wherein the polling means periodically receives a poll command from the CPU to poll the one of the plurality of peripheral devices;

(E) control logic means for controlling the switching means to couple the power supply to the CPU such that the CPU when in the inactive state is completely disconnected from the power supply and subsequently connected to the power supply by one of the periodic interrupt signal and the peripheral interrupt signal, wherein the control logic means is coupled to (1) the CPU, (2) the switching means, (3) the timer means, and (4) the polling means, wherein the control logic means receives the signal indicative of the inactive state of the CPU from the programming means via the CPU, wherein the control logic means receives the periodic interrupt signal from the timer means and the peripheral interrupt signal from the polling means, wherein the control logic means controls the switching means to disconnect the power supply to the CPU when the control logic means receives the signal indicative of the inactive state of the CPU, wherein when the CPU is disconnected to the power supply via the switching means by the control logic means, the addressable memory and the plurality of peripheral devices remain fully powered by the power supply, wherein the control logic means controls the switching means to connect the power supply to the CPU when the control logic means receives one of the periodic interrupt signal and the peripheral interrupt signal, wherein when the control logic means controls the switching means to connect the power supply to the CPU, the programming means then determines when the CPU is in the inactive state, wherein the programming means checks at every one of the periodic interrupt signal and the peripheral interrupt signal whether the CPU is in the inactive state, wherein when the programming means determines that the CPU is in the inactive state of the programming means generates the signal indicative of the inactive state of the CPU to the control logic means to cause the switching means to disconnect the power supply to the CPU, wherein the control logic means controls the switching means to continuously connect the power supply to the CPU in absence of the signal indicating the inactive state of the CPU; and (F) reset means for issuing a reset signal to reset the CPU whenever the CPU is connected to the power supply, wherein the reset means is coupled to (1) the CPU, (2) the timer means, and (3) the polling means, wherein the reset means receives the signal indicative of the inactive state of the CPU, the periodic interrupt signal, and the peripheral interrupt signal, wherein when control logic means controls the switching means to connect the CPU to the power supply after the CPU is disconnected with the power supply by the control logic means, the reset means generates the reset signal to the CPU, wherein the reset means does not generate the reset signal in the absence of the signal indicating the inactive state of the CPU.

2. The apparatus as in claim 1, wherein the programming means includes means for indicating the inactive state, wherein the programming means generates the signal indicating the inactive state of the CPU by setting the means for indicating the inactive state.

3. The apparatus as in claim 1, wherein the programming means is a set of program instructions.

4. The apparatus as in claim 1, wherein the predetermined interval is 1/60 of a second.

5. The apparatus as in claim 1, further comprising decoder means coupled to the CPU and the control logic means for decoding and coupling the signal indicative of the inactive state of the CPU generated by the programming means to the control logic means.

6. The apparatus as in claim 1, wherein said reset means maintains said reset signal during a predetermined time period, wherein the predetermined time period is provided by a counter.

7. The apparatus as in claim 6, wherein the predetermined time period is sufficient amount of time to cause said CPU to reset.

8. The apparatus as in claim 6, wherein the predetermined time period is approximately 50 micro-seconds.

* * * * *